(12) United States Patent
Gonzalez Martin et al.

(10) Patent No.: US 11,941,758 B2
(45) Date of Patent: Mar. 26, 2024

(54) PROCESSING MERGED 3D GEOMETRIC INFORMATION

(71) Applicant: Hewlett-Packard Development Company, L.P., Spring, TX (US)

(72) Inventors: Sergio Gonzalez Martin, Sant Cugat del Valles (ES); Manuel Freire Garcia, Sant Cugat del Valles (ES); Jordi Roca Vila, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 150 days.

(21) Appl. No.: 17/251,962

(22) PCT Filed: Mar. 21, 2019

(86) PCT No.: PCT/US2019/023354
§ 371 (c)(1),
(2) Date: Dec. 14, 2020

(87) PCT Pub. No.: WO2020/190299
PCT Pub. Date: Sep. 24, 2020

(65) Prior Publication Data
US 2021/0407197 A1 Dec. 30, 2021

(51) Int. Cl.
*G06T 17/20* (2006.01)
*B29C 64/393* (2017.01)
*B33Y 50/02* (2015.01)

(52) U.S. Cl.
CPC ............ *G06T 17/20* (2013.01); *B29C 64/393* (2017.08); *B33Y 50/02* (2014.12)

(58) Field of Classification Search
None
See application file for complete search history.

(56) References Cited

U.S. PATENT DOCUMENTS

| | | | |
|---|---|---|---|
| 9,636,871 B2 | 5/2017 | Butler et al. |
| 2011/0087350 A1 | 4/2011 | Fogel et al. |
| 2015/0352792 A1 | 12/2015 | Kanada |
| 2016/0198576 A1 | 7/2016 | Lewis et al. |
| 2017/0129168 A1 | 5/2017 | El-Siblani et al. |
| 2017/0203515 A1 | 7/2017 | Bennett et al. |

(Continued)

FOREIGN PATENT DOCUMENTS

| WO | WO-2018/029694 A1 | 2/2018 |
| WO | WO-2018031594 A1 | 2/2018 |

*Primary Examiner* — Nurun Flora
(74) *Attorney, Agent, or Firm* — Michael Dryja (57) ABSTRACT

A method of processing merged 3D geometric information in a 3D printing system is described that receives a 3D object model file representing at least two physical 3D parts to be printed, wherein the 3D object model file comprises 3D geometric information for the at least two physical 3D parts, wherein the 3D geometric information is encoded as at least one logical 3D part, wherein at least one of the at least one logical 3D part comprises merged 3D geometric information for at least a subset of the at least two physical 3D parts. From the 3D object model file, a separate set of 3D geometric information for each of the at least two physical 3D parts is extracted and each separate set of 3D geometric information is processed individually before printing the physical 3D parts.

16 Claims, 6 Drawing Sheets

(56) References Cited

U.S. PATENT DOCUMENTS

| | | | |
|---|---|---|---|
| 2017/0368753 A1 | 12/2017 | Yang et al. | |
| 2017/0372480 A1* | 12/2017 | Anand | G06T 7/11 |
| 2018/0111320 A1 | 4/2018 | Zhao et al. | |
| 2018/0253078 A1* | 9/2018 | Sennoun | G05B 19/4099 |
| 2019/0210288 A1* | 7/2019 | Elber | G06T 17/05 |

* cited by examiner

PROCESSING MERGED 3D GEOMETRIC INFORMATION

BACKGROUND

Additive manufacturing processes may produce three-dimensional (3D) objects, i.e. physical 3D parts, by providing a layer-by-layer accumulation and solidification of build material patterned from digital 3D object model files that comprise 3D geometric information about the 3D parts to be printed. There is a wide range of software applications that produce such digital 3D object model files. In some applications, it is possible to merge the physical 3D parts to be printed into one single logical 3D part, i.e. the information contained in the digital 3D object model file does not comprise any separation identifier that enables distinction between the 3D geometric information of one physical 3D part and the 3D geometric information of another physical 3D part.

BRIEF DESCRIPTION OF THE DRAWINGS

Features and advantages of examples will be described, by way of example, in the following detailed description with reference to the accompanying drawings in which like reference numerals correspond to similar, though perhaps not identical, components. For the sake of brevity, reference numerals or features having a previously described function may or may not be described in connection with other drawings in which they appear.

The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In some additive manufacturing or 3D printing processes, 3D objects or parts may be formed on a layer-by-layer basis where each layer is processed and combined with a subsequent layer until the 3D object is fully formed. Throughout this description, the terms 'part' and 'object' and their variants may be used interchangeably.

In various 3D printing processes, a 3D object being produced may be patterned from a digital 3D object model file. Information in such a 3D object model file comprises 3D geometric information that describes the shape of the 3D model. This information may be stored as plain text or binary data in various 3D file formats, such as STL, VRML, OBJ, FBX, COLLADA, 3MF, and so on. Some 3D object model file formats may store additional information, such as information indicating colors, textures and/or surface finishes, material types, and mechanical properties and tolerances, and the orientation and positioning of a 3D object within a build area of a 3D printing system during printing.

The information in a 3D object model file may define solid portions of a 3D object to be printed or produced. To produce a 3D object from a 3D object model, the 3D model information may be processed to provide 2D planes or slices of the 3D model. Each 2D slice generally comprises an image and/or data that may define an area or areas of a layer of build material as being solid part areas where the powder is to be solidified during a 3D printing process. Thus, a 2D slice of a 3D object model may define areas of a powder layer that are to be solidified. Conversely, areas of a powder layer that are not defined as part areas by a 2D slice comprise non-part areas where the powder is not to be solidified and will not receive a liquid functional agent.

In some examples of powder-based and fusing agent 3D printing systems, layers of powdered build material may be spread over a platform or print bed within a build area or build volume. As noted above, a liquid functional agent, i.e. a fusing agent, may be selectively applied to each powder layer in areas where the particles of powdered material are to be fused together or solidified to form a part as defined by each 2D slice of a 3D object model. Each layer in the build area may be exposed to a fusing energy to thermally fuse together and solidify the particles of powdered material where the fusing agent has been applied. This process may be repeated, one layer at a time, until a 3D part or a plurality of 3D parts have been formed within the build area.

Hence, the 3D geometric information comprised by a 3D object model file has to be individually sliced first in order to generate the 2D slice content that will be printed. If the 3D geometric information defined in the 3D object model file is not well formed, it may cause that the printed physical 3D parts are incorrect. The resulting output of such errors may be so small that it does not affect the part quality but, in other cases, it may produce bigger artifacts which significantly reduce the part quality.

In some additive manufacturing processes that use heat to melt and solidify (upon cooling) portions of layers of build material to form 3D parts, such as the 3D printing processes noted above, the printed part cools down to ambient temperature once all the layers of the have been printed. During this cooling process, the printed part may experience dimensional variations such as part shrinkage. This shrinkage is known to be somewhat dependent upon the type of build material being used to form the part.

In addition to the type of build material, however, there are other factors that may influence dimensional variations when a part cools down. Thermal non-uniformities within the build area or build volume of a 3D printing system, for example, may cause a 3D part to experience different levels of shrinkage depending on the position of the part within the build volume. For example, different areas within the build volume may have different thermal profiles and may cool at different rates, which may cause parts to shrink differently. Depending on the positioning of a part within the build volume, the whole part may experience a uniform level of shrinkage, or different areas of the part may experience different levels of shrinkage.

Therefore, the 3D geometric information for 3D parts to be printed stored in a 3D object model file may have to be processed before printing, e.g. in order to provide accurate compensation for dimensional variations that may occur during printing of 3D parts, to adapt the locations of the 3D objects in the print bed, to correct errors in the 3D geometric information, or the like.

There is a wide range of software applications, e.g. HP SmartStream 3D Build Manager, Materialise Magics, Autodesk Meshmixer, and many more, that produce 3D object model files to be printed. A user may create in these applications a 3D object model that may define one or more physical 3D parts to be printed. Each one of those applications may have different functionalities. The user may, thus, use more than one tool when preparing the final 3D object model file that is sent to the 3D printing system. To avoid errors, the user may merge some or all of the 3D parts to be printed into a single logical 3D part comprised by the 3D object model file.

In the context of this application, merging 3D geometric information of 3D parts to be printed means that the different physical 3D parts are encoded all together as a single 3D part within the 3D object model file. The distinct physical 3D parts, thus, form one logical unit, the logical 3D part, that appears to be one physical 3D object but comprises the 3D geometric information of a plurality of 3D parts.

For example, it may happen that a software application gets non-responsive when trying to visualize a plurality of complex 3D geometries represented by means of triangle meshes. To overcome this, a user may merge all the 3D parts in a different software application B. This may help that the content can be properly visualized in the application A used for sending the 3D object model file to the 3D printing system. Another example is when the user wants that some of the 3D parts are printed close together maintaining a certain separation between them while executing some automatic packing algorithm. In this case, the user may merge the parts of interest to keep the intended spacing.

Although merging 3D parts to be printed into one logical 3D part comprised by the 3D object model file may have benefits to the user, it may lead to disadvantages for printing the physical 3D parts. As there are examples of processes that are calculated based on the geometry, location in the print bed, or further information of each 3D part to be printed, merging a plurality of 3D parts into one logical 3D part may lead to less accurate processing.

As an example, if the 3D object model file comprises one logical 3D part that resulted from a merge of a plurality of physical 3D parts to be printed, one compensation factor for compensating the dimensional variations during printing is calculated and applied to the logical 3D part as a whole. However, if the 3D object model file would instead comprise a logical 3D part for each physical 3D part to be printed, a different compensation factor may be applied to each of the logical 3D parts, which then results in a more accurate printing of the 3D parts.

Accordingly, examples provided herein address this processing of merged 3D geometric information when printing 3D objects. An example method therefore is able to extract, from a 3D object model file that comprises merged 3D geometric information for a plurality of 3D parts to be printed, a separate set of 3D geometric information for each physical 3D part, and, thus, process each separate set of 3D geometric information individually.

Figure 1:
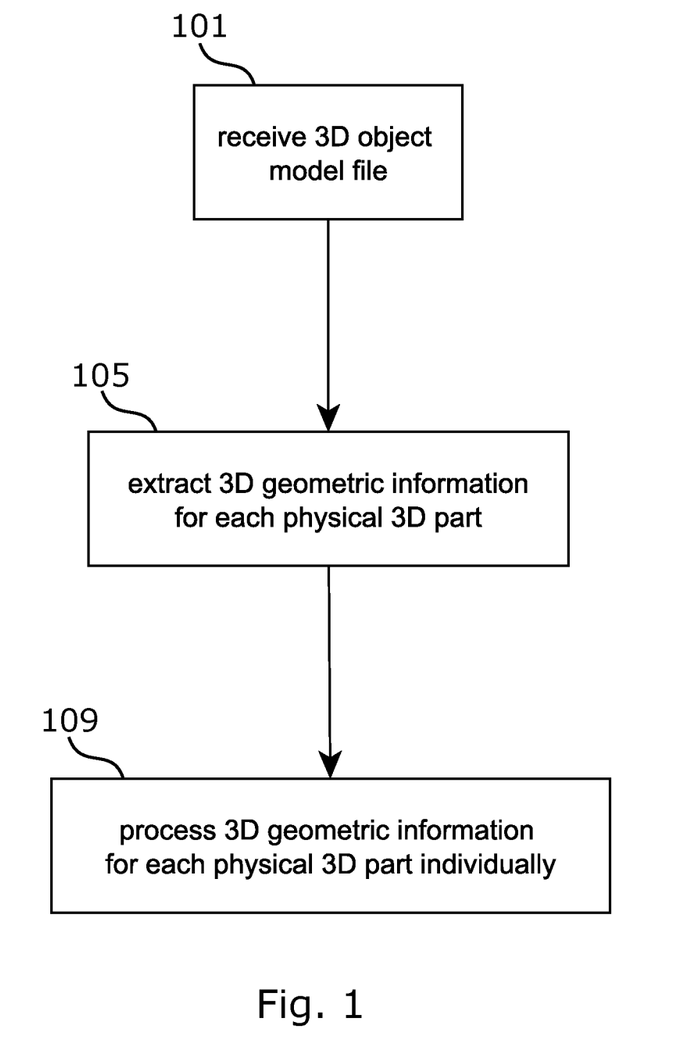
FIG. 1 provides a flowchart of an example method of processing merged 3D geometric information in a 3D printing system according to an example.

In FIG. 1, the basic features of the method of processing merged 3D geometric information in a 3D printing system are illustrated. A 3D printing system may be a 3D printer that itself comprises all components to perform the methods described herein. However, the 3D printing system may also be composed of distributed apparatuses that are connected via a network, such as LAN (Local Area Network), WAN (Wide Area Network), Internet, or any other suitable network, wherein the components to perform the methods described herein are distributed among the apparatuses. An example 3D printing system may, thus, comprise a 3D printer that may be connected via LAN or with an application server and a database server or any other suitable structure. It is understood that the 3D printing system herein described may comprise additional components and may perform additional functions not specifically illustrated or discussed herein.

The 3D printing system may impose that 3D geometric information for the physical 3D parts to be printed is transmitted to it. The 3D geometric information may be encoded in a 3D object model file; hence, the 3D object model file represents physical 3D parts to be printed. The 3D geometric information comprised by the 3D object model file may be encoded as logical 3D parts, i.e. there may exist identifier in the 3D object model file that distinguish one logical 3D part from another. For example, the 3D object model file may represent three physical 3D objects to be printed and comprise the sequence "{data1}, {data2}, {data3}" with data1 being the 3D geometric information for the first physical 3D object, data2 for the second, and data3 for the third. The curly brackets may identify three logical 3D parts, which in this case are identical with the physical 3D parts.

At least one of the logical 3D parts comprised by the 3D object model file may contain merged 3D geometric information for at least a subset of the physical 3D parts to be printed. For example, if data1A represents 3D geometric information for a physical 3D object to be printed and data1B represents 3D geometric information for another physical 3D part, data1A and data1B may be merged into one logical 3D part. In this case, the corresponding 3D object model file may again comprise the sequence "{data1}, {data2}, {data3}" with data1 comprising data1A as well as data1B. When the 3D printing system receives such a 3D object model file with merged 3D geometric information at block 101, it may extract at block 105, from the 3D object model file, a separate set of 3D geometric information for each physical 3D part to be printed. These separate sets of 3D geometric information may then be processed individually at block 109 before printing the physical 3D parts.

Any procedure that may be applied on the 3D geometric information prior to printing the 3D objects may work as a process in the sense of this application. Examples for processing such 3D geometric information comprise calculating compensation factors for compensating the dimensional variations during printing, correcting errors in the 3D geometric information or the like. Any processing that can be applied on 3D geometric information may be used.

Figure 2A:
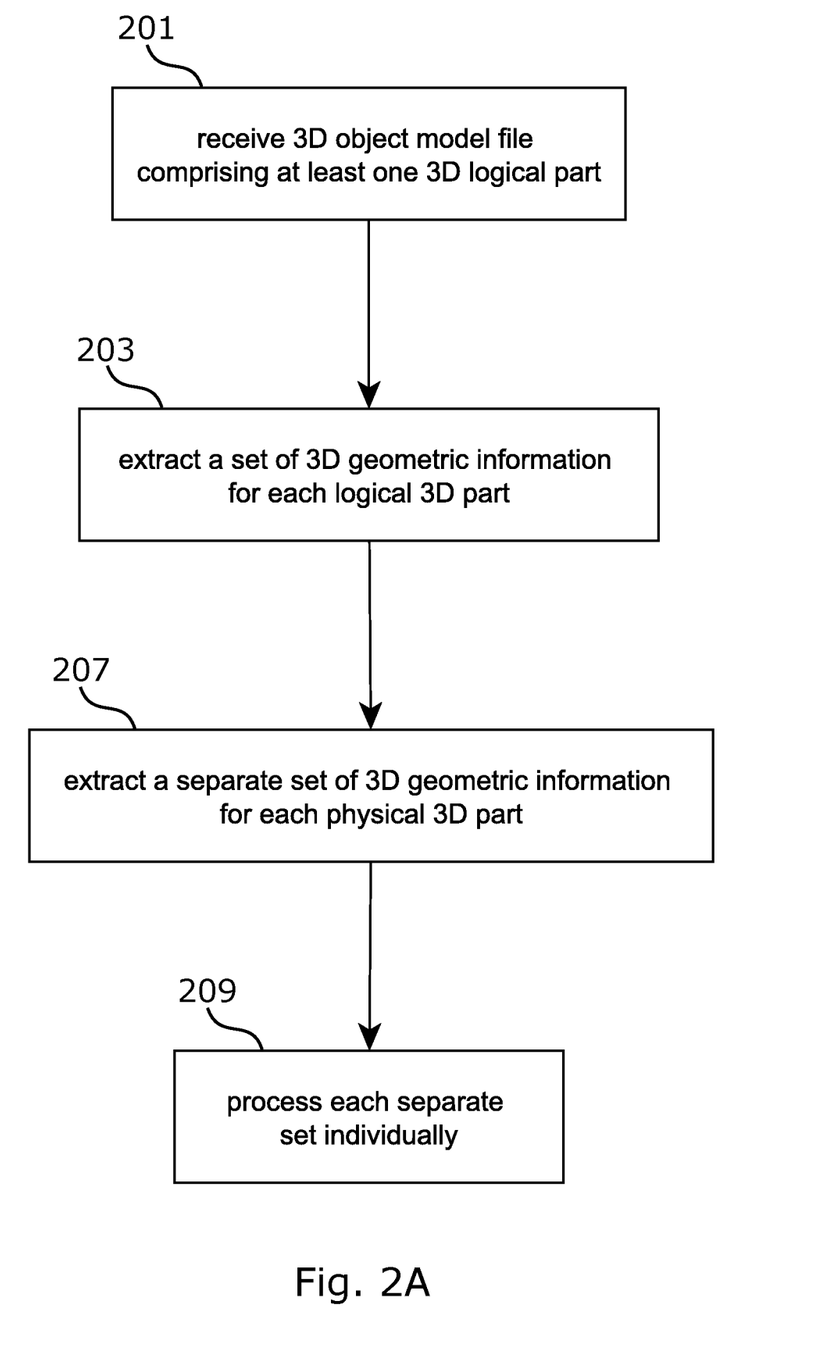
FIGS. 2A and 2B provide flowcharts of example processes when extracting a separate set of 3D geometric information for each physical 3D part to be printed.

Turning now to FIG. 2A that shows a flowchart of another example method. The 3D printing system may receive at block 201 a 3D object model file that comprises merged 3D geometric information. Therefrom, the 3D geometric information may be extracted for each logical 3D part at block 203. The extracted 3D geometric information for a logical 3D part may then be analyzed. If there is merged 3D information comprised by this logical 3D part, the 3D geometric information for each physical 3D part may be extracted at block 207 and processed at block 209 individually.

For example, the 3D object model file may comprise the sequence "{data1}, {data2}, {data3}" with data1 being the 3D geometric information for logical 3D part L1, data2 for logical 3D part L2, and data2 for logical 3D part L3. In this example, data1 itself may comprise merged 3D geometric information for physical 3D objects 1OA, 1OB, and 1OC. The 3D geometric information for the L1, i.e. data1, may be extracted first. Then, data1 may then be analyzed and the 3D geometric information for each physical 3D object may be extracted. This may result in three sets of 3D geometric information, data1OA, data1OB, and data1OC, each representing one physical 3D object. The extracted sets of 3D geometric information, data1OA, data1OB, and data1OC. Then, data1OA, data1OB, and data1OC are processed separately.

The person skilled in the art will know that any order of the above-mentioned processes may be applied that enables the 3D geometric data of each physical 3D part to be printed to be processed individually. As an example, the 3D geometric information for all logical 3D parts may be extracted first. Then, the 3D geometric information for each physical 3D part may be extracted on a logical 3D part basis. Moreover, some processes may be processed in a sequential as well as in parallel order or a combination thereof. As another example, the extraction of the 3D geometric information for each physical 3D part from the logical 3D parts may be run in parallel for all 3D logical parts.

Figure 2B:
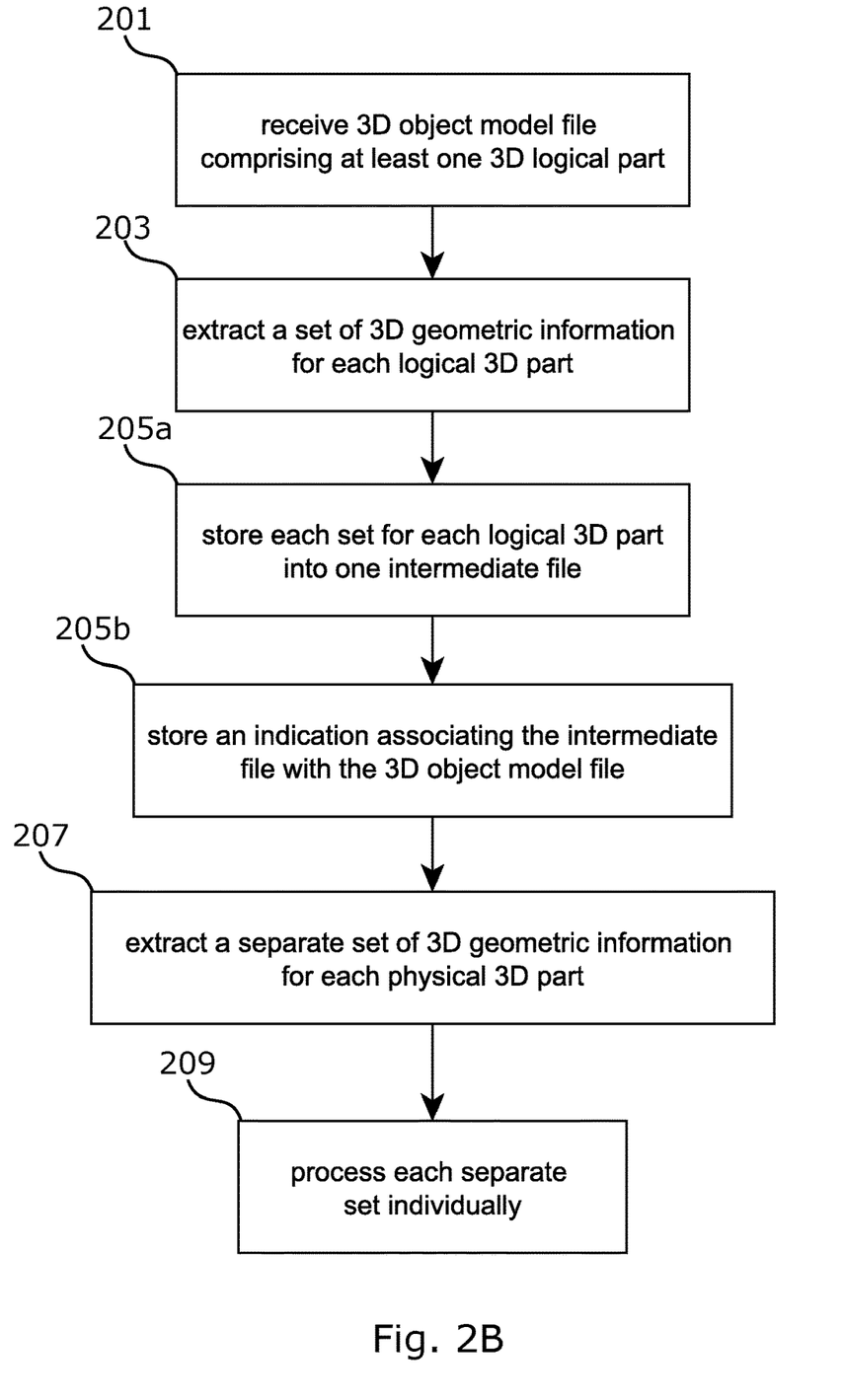

The example method shown in FIG. 2A may also be accompanied with storing intermediate temporal files which is shown in FIG. 2B. Therefore, the 3D printing system may receive a 3D object model file that comprises merged 3D geometric information at block 201. The 3D geometric information may be extracted for each logical 3D part at block 203. These processes are the same as for the example method shown in FIG. 2A.

For each logical 3D part, one intermediate file is stored that comprises the extracted 3D geometric information. This is shown in block 205a. The intermediate files may be stored, for example, in a cache of an internal memory of the 3D printer, in an external file database, or any other suitable storage. Furthermore, shown in block 205b, an indication may be stored that associates the intermediate files with the 3D object model file they were extracted from. This indication may be included into the intermediate files, into the original 3D object model file, into a new file comprising information about the original 3D object model file and the intermediate files, or the like. The indication may be implemented as pointer to the 3D object model file and/or the intermediate files, unique identifiers suitable to retrieve the 3D object model file and/or the intermediate files from the storage, or any other reference.

After having extracted the 3D geometric information for a logical 3D part, stored it into an intermediate file, and stored an indication associating the intermediate file with the 3D object model file, the 3D geometric information for each physical 3D part may be extracted from the intermediate files at block 207 and processed individually at block 209. These processes are again the same as for the example method shown in FIG. 2A.

The method may also comprise storing intermediate files that each comprises the 3D geometric information of one 3D part to be printed. These files may then accordingly comprise an identifier that associate the intermediate files for a 3D part to be printed with the corresponding 3D object model file and/or with the intermediate files for the logical 3D parts. These intermediate files may be stored in the same storage the other files are stored in but also in any other suitable place for storing these files. For example, intermediate files for each 3D part to be printed may be stored in the 3D printer but the 3D object model file and the intermediate files for the 3D logical parts may be stored on a database server connected to the 3D printer. The method may further store, for each separate set of 3D geometric information, an identifier associating the 3D geometric information with the respective logical 3D part and/or the 3D object model file.

3D geometric information may be encoded as a polygon mesh or a collection of polygon meshes in combination with transformation matrices that place and scale the 3D object model files in the print bed. Polygon meshes that can be used to represent 3D objects are e.g. triangle meshes, quadrilateral meshes, or other simple convex polygon meshes. In order to store such a mesh in a file, it is sufficient to use some elements of the mesh.

For example, some applications may store vertices, edges, and faces, whereas other applications may store surfaces and polygons in addition to or instead of some of the above-mentioned elements. A vertex is a position in the corresponding 3D space that may be stored along with other information such as color, normal vector, and texture coordinates. An edge is a connection between two vertices. A face is closed set of edges. For example, a triangle face has three edges, and a quad face has four edges. Polygons comprise a plurality of coplanar faces; surfaces are a set of faces, coplanar and non-coplanar, that form somehow a group.

Figure 3A:
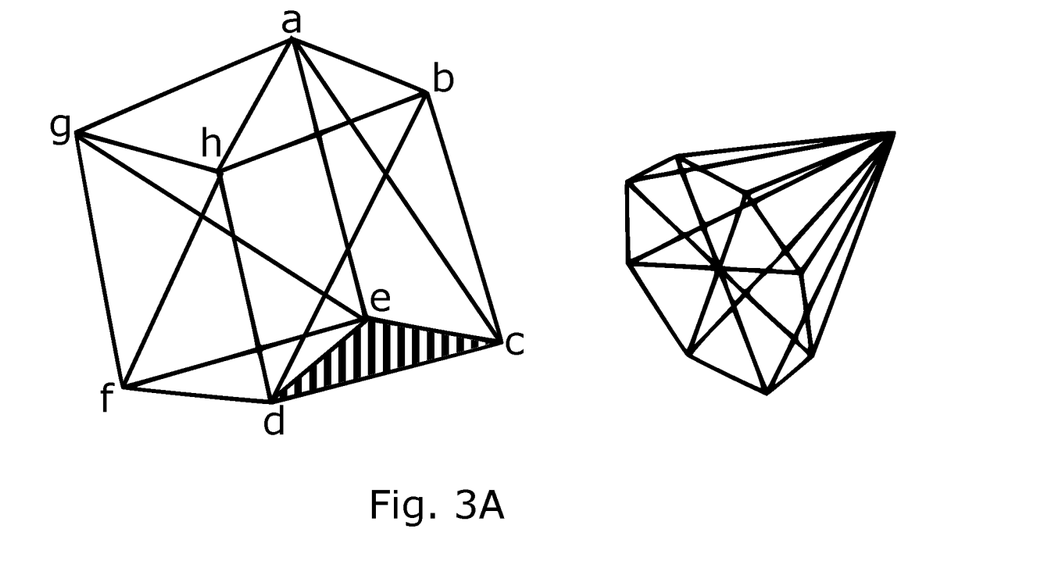
FIG. 3A to 3D show an example of extracting a separate set of 3D geometric information for each physical 3D part to be printed on the example of triangle meshes as 3D geometric information.

FIG. 3A shows two 3D objects to be printed represented by a triangle mesh each. The 3D geometric information stored in a corresponding 3D object model file may comprise a list of vertices of the objects and a set of triangles that each point to the vertices it uses. For example, the list of vertices of the cube on the left would be "a, b, c, d, e, f, g, h", wherein "a" may reflect the position (0, 0, 0), "b" the position (1, 0, 0), "c" the position (1, 1, 0), "d" the position (1, 1, 1) and so on. The associated transformation matrix may then position the cube into the relevant 3D space, e.g. the print bed. The set of triangles would for example comprise the triangle "a→b→c" that points to the vertices "a", "b", and "c".

If the two 3D objects shown in FIG. 3A, i.e. the cube on the left and the cone on the right, have been merged by a user or automatically by a program, the resulting 3D object model file may comprise one logical 3D part that is described by the 3D triangle mesh information of both 3D parts to be printed. However, as described above, it may be useful to process each physical 3D part to be printed individually. Therefore, a separate set of 3D geometric information for each physical 3D part may be extracted.

The sequence of FIG. 3A to 3D show how this extraction may be achieved if the 3D geometric information comprises a triangle mesh and a procedure based on connected regions is applied. The idea is to divide all triangles from the triangle mesh in different groups based on the connectivity of the mesh, i.e. to find the triangles that are interconnected as they represent one 3D part to be printed.

Figure 3B:
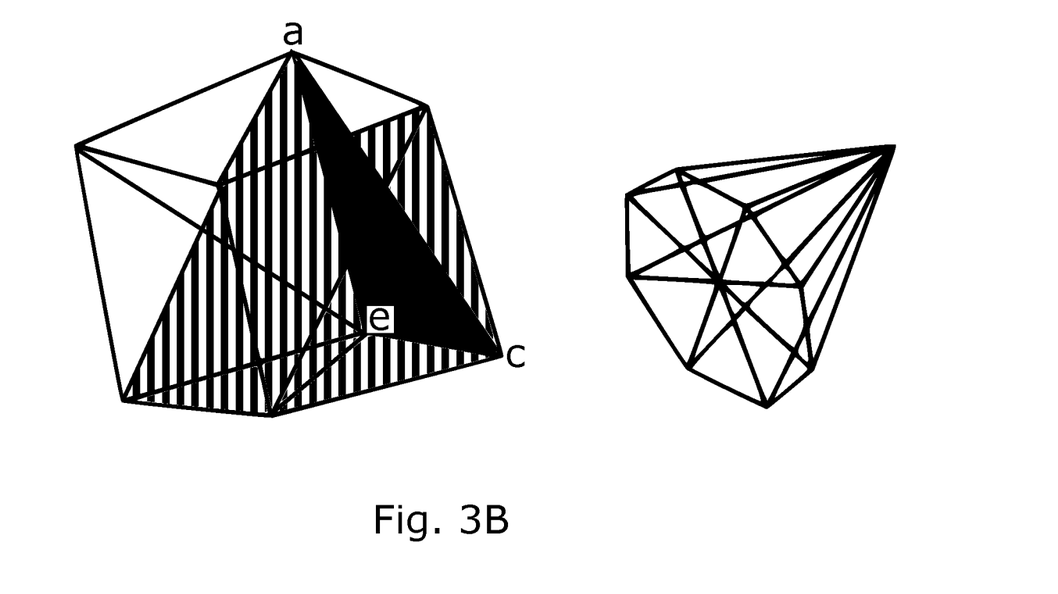

The procedure may start from an arbitrary triangle. For example, the triangle "d→e→c", indicated as hatched triangle, may be chosen as shown in FIG. 3A. Then, all neighbor triangles may be detected, e.g. by choosing triangles that have shared vertices. In FIG. 3B all neighbor triangles of the starting triangle "d→e→c" are also hatched or filled. For example, the triangle "e→a→c" filled out in black in FIG. 3B is such a neighbor triangle to the starting triangle "d→e→c".

Figure 3C:
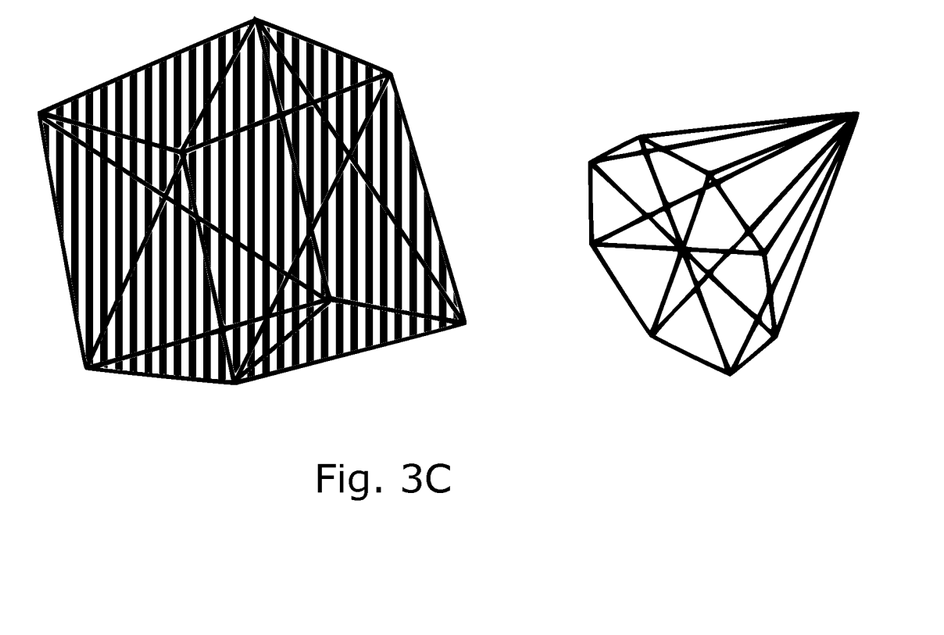

The processes of finding neighbor triangles may be repeated for all new neighbor triangles, i.e. the procedure may detect neighbor triangles for each previously detected neighbor triangle, until no more connected neighbor triangles are found. This is shown in FIG. 3C, where all triangles of the cube on the left have been detected, indicated by the hatched area. While finding neighbor triangles, the procedure may store the found neighbor triangles and vertices in a list that is, thus, iteratively filled.

If the procedure has finished, i.e. there are no more connected and unfound neighbor triangles, the procedure may remove the found triangles and vertices from the original triangle mesh or otherwise indicate them as already processed and start again with one remaining arbitrary triangle.

Figure 3D:
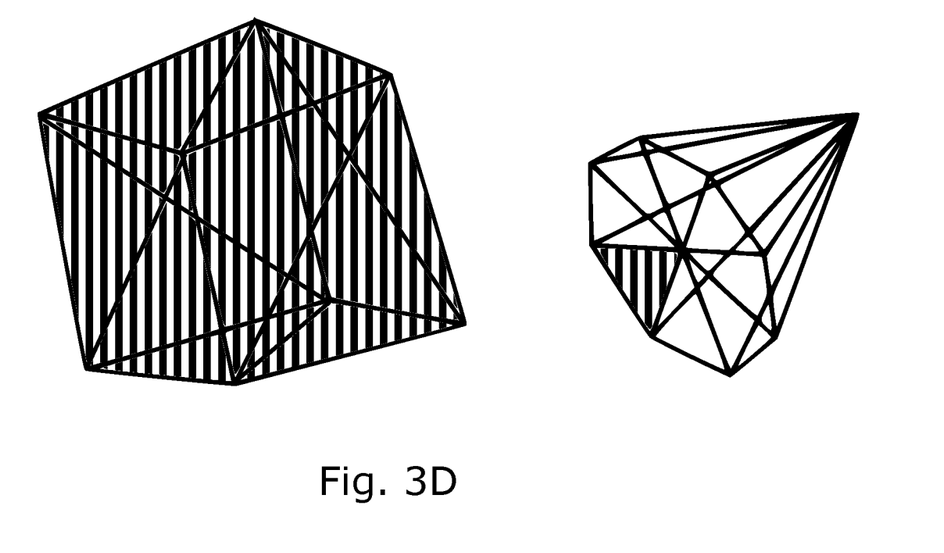

On the example of FIG. 3D, the next triangle to start with is one triangle belonging to the cone on the right, which is again indicated as hatched triangle. The procedure then fulfills again the processes described above. Thus, one region of connected triangles after another is detected from the triangle mesh until there are no more additional regions remaining. The procedure may store each list of connected triangles, i.e. the 3D geometric information of each 3D object to be printed, as new separate triangle mesh and process those separate triangle meshes individually.

An example for a procedure that may be used is the procedure implemented in vtkPolyDataConnectivityFilter from the VTK open source library. However, the person skilled in the art will know that any procedure that is able to separate 3D geometric information may be used. The choice may be based on different considerations, e.g. if the 3D object model file comprises a triangle or quadrilateral mesh, if parallelization of the processes is possible, whether the 3D object model file comprises additional information about the mesh, and the like. For example, if the 3D geometric information is encoded as triangle mesh and it is known a priori that the merged 3D geometric information is still ordered, it may be sufficient to search for a jump in the positions of the vertices to determine the separate sets.

The extraction of 3D geometric information to receive separate 3D geometric information for each 3D part to be printed may be used for different processing actions. For example, compensation factors for compensating the dimensional variations during printing may be computed for each of the 3D parts to be printed. Therefore, from the position of the extracted separate 3D geometric information of a 3D part to be printed, target sub-volumes of a build volume into which the 3D part is to be printed may be determined. Then, a dimensional compensation factor associated with each target sub-volume may be received, which may be applied to scale the 3D part according to the position of the 3D part within the build volume.

In some examples, applying the dimensional compensation factor to the 3D object includes generating scaled 3D geometric information for the 3D object to be printed. The scaled 3D geometric information for the 3D object to be printed may be converted into scaled 2D slice data. Each layer of the 3D part will then be printed according to corresponding scaled 2D slice data.

Figure 4:
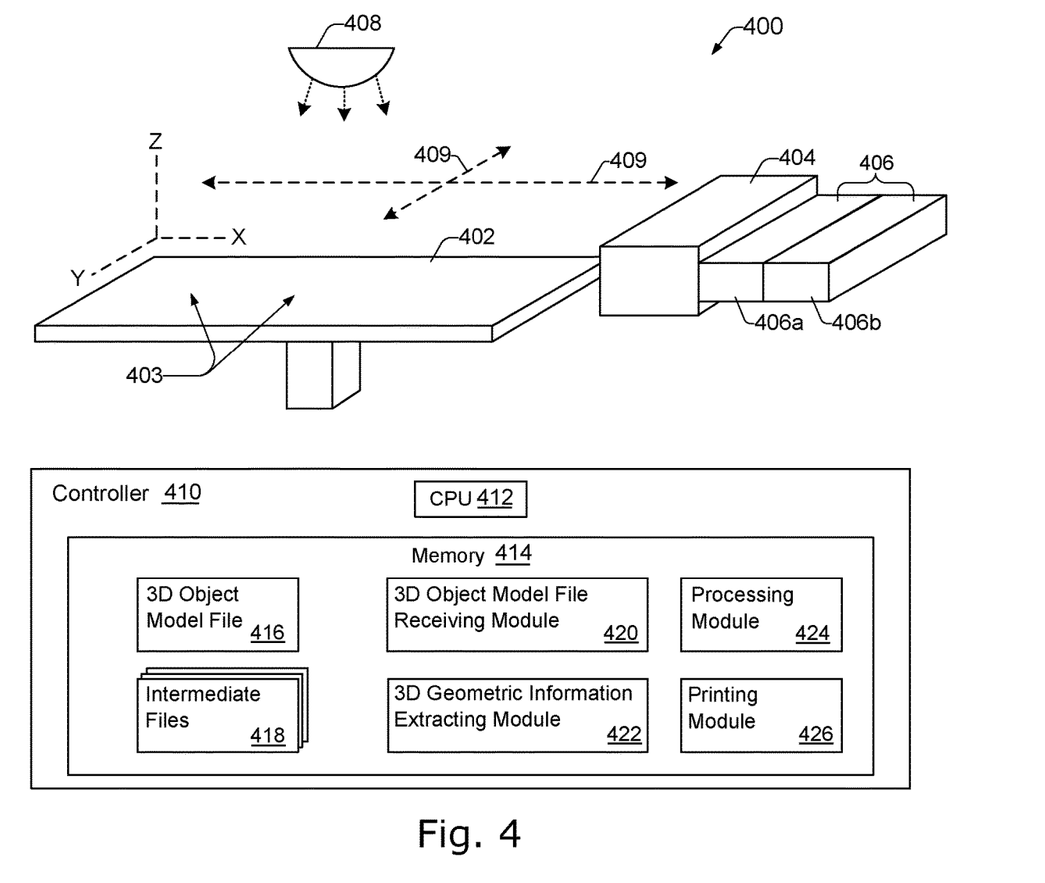
FIG. 4 shows an example of a 3D printing system, according to an example, for processing merged 3D geometric information.

Turning now to FIG. 4, in which an example of a 3D printing system 400 for processing merged 3D geometric information is shown. The 3D printing system 400 is shown by way of example and is not intended to represent a complete 3D printing system. Thus, it is understood that an example system 400 may comprise additional components and may perform additional functions not specifically illustrated or discussed herein.

An example 3D printing system 400 includes a moveable print bed or build platform 402 to serve as the floor to a work space or build volume/area 403 in which 3D objects may be printed. In some examples, the print bed 402 can move in a vertical direction in a z-axis direction. The build volume 403 of a 3D printing system generally refers to a volumetric work space that develops above the moveable print bed 402 as the print bed moves vertically downward during the layer-by-layer printing and solidification of each layer of a 3D part. This work space can be alternately referred to herein as a build volume, a build area, a work space, and the like.

In some examples, the build volume 403 can be subdivided into sub-volumes. An example 3D printing system 400 also includes a powdered build material distributor 404 that may provide a layer of powder over the print bed 402. The powder distributor 404 may include a powder supply and powder spreading mechanism such as a roller or blade to move across the print bed 402 in the x-axis direction to spread a layer of powder.

In an example, a liquid agent dispenser 406 may deliver a liquid functional agent, such as a fusing agent, detailing agent, or any other suitable agent, from a fusing agent dispenser 406a and detailing agent dispenser 406b, respectively, in a selective manner onto areas of a powder layer provided on the print bed 402. Liquid agent dispensers 406 can include, for example, a printhead or printheads, such as thermal inkjet or piezoelectric inkjet printheads. In some examples, a printhead dispenser 406 can comprise a page-wide array of liquid ejectors that spans across the full y-axis dimension of the print bed 402 and moves bi-directionally in the x-axis as indicated by direction arrow 407 while it ejects liquid droplets onto a powder layer spread over the print bed 102.

In other examples, a printhead dispenser 406 can comprise a scanning type printhead. A scanning type printhead can span across a limited portion or swath of the print bed 402 in the y-axis dimension as it moves bi-directionally in the x-axis as indicated by direction arrow 407, while ejecting liquid droplets onto a powder layer spread over the print bed 402. Upon completing each swath, a scanning type printhead can move in the y-axis direction as indicated by direction arrow 409 in preparation for printing another swath of the powder layer on print bed 402.

The example 3D printing system 400 also includes a fusing energy source 408, such as radiation source 408, that can apply radiation to powder layers on the print bed 402 to facilitate the heating and fusing of the powder. In some examples, the energy source 408 can comprise a scanning energy source that scans across the print bed 402 in the x-axis direction.

An example 3D printing system 400 additionally includes an example controller 410. The example controller 410 can control various components and operations of the 3D printing system 400 to facilitate the processing and printing of 3D parts as generally described herein, such as controllably spreading powder onto the print bed 402, selectively applying/printing fusing agent and detailing agent to portions of the powder, and exposing the powder to radiation. In addition, the controller 410 can further control components and operations of the 3D printing system 400 to provide compensation for dimensional variations that can occur during the printing of 3D parts.

An example controller 410 can include a processor (CPU) 412 and a memory 414. The controller 410 may additionally include other electronics (not shown) for communicating with and controlling various components of the 3D printing system 400. Such other electronics can include, for example, discrete electronic components and/or an ASIC (application specific integrated circuit).

Memory 414 can include both volatile and nonvolatile memory components, such as ROM, hard disk, optical disc, CD-ROM, flash memory, etc. The components of memory 414 comprise non-transitory, machine-readable media that may provide for the storage of machine-readable coded program instructions, data structures, program instruction modules, JDF (job definition format), plain text or binary data in various 3D file formats such as STL, VRML, OBJ, FBX, COLLADA, 3MF, and other data and/or instructions executable by the processor 412 of the 3D printing system 400.

As shown in the example controller 410 of FIG. 4, an example of stored data in the memory 414 may include 3D object model file data 416 and intermediate file data 418. An example of executable instructions to be stored in memory 414 may include instructions associated with modules 420, 422, 424 and 426.

A 3D Object Model File Receiving Module 420 may receive a 3D object model file from a client device, e.g. a personal computer, a mobile phone, a high-performance computer cluster, and the like, connected to the 3D printing system via a network. A 3D Geometric Information Extracting Module 422 may first determine whether the 3D object model file comprises merged 3D geometric information for physical 3D parts to be printed and then extract from the received 3D object model file a separate set of 3D geometric information for each physical 3D part. A Processing Module 424 may process each 3D geometric information individually, e.g. computes an adapted compensation factor for each of the separate sets of 3D geometric information or corrects errors in the 3D geometric information for each of the separate sets of 3D geometric information. A Printing Module 426 may finally print the physical 3D parts.

The 3D printing system 400 may comprise modules to extract, from the 3D object model file 416, a set of 3D geometric information for each logical 3D part comprised therein and extract the separate set of 3D geometric information for each physical 3D part. In an example, the 3D printing system 400 may also comprise instructions to store the set of 3D geometric information associated with each logical 3D part into a separate intermediate file and to store an indication associating the intermediate file with the 3D object model file.

In another example, the 3D printing system 400 may receive a 3D object model file that comprises a collection of triangle meshes and transformation matrices. The 3D printing system 400 may then comprise modules to find connected regions in the collection of triangle meshes and to store a triangle mesh for each identified closed surface into a separate intermediate file. Although the 3D printing system 400 is described herein as storing different modules associated with the instructions, other configurations are possible, such as that all instructions may be associated with one module or a plurality of modules may corporate on a set of instructions.

The 3D object model file 416 may be received in a 3D file format such as 3MF, for example. The 3D object model file 416 may include 3D geometric information that describes the shape of the physical 3D object to be printed, as well as information indicating colors, surface textures, build material types, the position for printing the 3D part within the build volume 403, and so on. The example printing system 400 may further be constructed in such a manner that it is able to execute all methods described herein.

Figure 5:
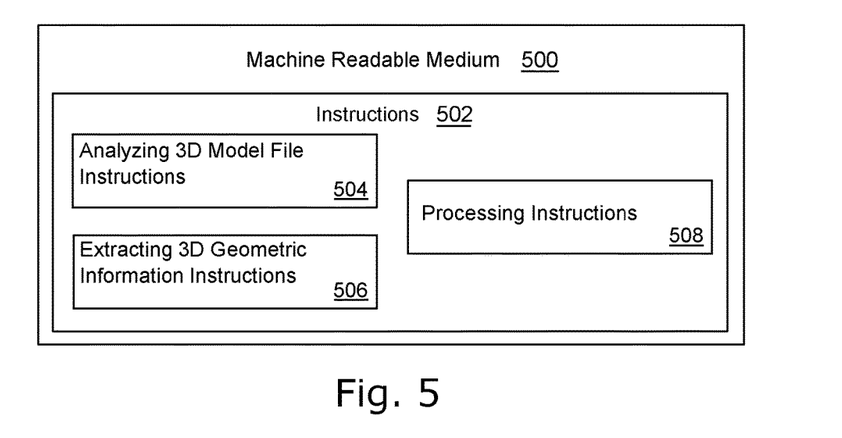
FIG. 5 shows an example of a machine-readable medium in accordance with the methods described herein.

FIG. 5 shows an example of a tangible, non-transitory, machine-readable medium 500 that may comprise instructions 502. These instructions may, when executed by a processor, such as for example the processor 412, cause the processor to carry out processes. The instructions 502 may comprise subsets of instructions, e.g. instructions 504 to analyze a 3D object model file. The 3D object model file may represent at least two physical 3D parts to be printed and may comprise 3D geometric information for the at least two physical 3D parts. This 3D geometric information may be encoded as at least one logical 3D part, wherein at least one of the at least one logical 3D part comprises merged 3D geometric information for at least a subset of the at least two physical 3D parts to be printed.

The instructions 502 may further comprise instructions 506 to extract, from the 3D object model file, a separate set of 3D geometric information for each of the at least two physical 3D parts in response to determining that at least one of the at least one logical 3D part comprises merged 3D geometric information for at least a subset of the at least two physical 3D parts. The instructions 502 may also comprise instructions 508 to apply individual processing procedures to at least some separate sets of 3D geometric information.

Examples in the present disclosure may be provided as methods, systems or machine-readable instructions, such as any combination of software, hardware, firmware or the like. Such machine-readable instructions may be included on a computer readable storage medium, including but is not limited to disc storage, CD-ROM, optical storage, etc., having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that various blocks in the flow charts and block diagrams, as well as combinations thereof, can be realized by machine-readable instructions.

The machine-readable instructions may, for example, be executed by a general-purpose computer, a special-purpose computer, an embedded processor or processors of other programmable data processing devices to realize the functions described in the description and diagrams. In particular, a processor or processing apparatus, such as the processor 412, may execute the machine-readable instructions. A processor may be a CPU, processing unit, ASIC, logic unit, or programmable gate array, or the like. The methods and functional modules may all be performed by a single processor or divided amongst several processors.

Such machine-readable instructions may also be stored in a computer readable storage that can guide the computer or other programmable data processing devices to operate in a specific mode. Such machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It should be noted that the above-mentioned examples illustrate rather than limit what is described herein, and that those skilled in the art will be able to design many alternative implementations without departing from the scope of the appended claims. Features described in relation to one example may be combined with features of another example.

What is claimed is:

1. A method comprising:
receiving, by a processor, a three-dimensional (3D) object model file representing a plurality of physical 3D parts to be printed, the 3D object model file comprising 3D geometric information for the physical 3D parts, the 3D geometric information encoded as a logical 3D part, the logical 3D part comprising merged 3D geometric information for the physical 3D parts;
extracting, by the processor and from the 3D object model file, a separate set of 3D geometric information for each physical 3D part;
individually processing, by the processor, the separate set of 3D geometric information for each physical 3D part, comprising individually computing an adapted compensation factor for the separate set of 3D geometric information for each physical 3D part; and
causing, by the processor, the physical 3D parts to be printed using a 3D printing system in accordance with the separate set of 3D geometric information for each physical 3D part as has been individually processed.

2. The method of claim 1, wherein extracting the separate set of 3D geometric information for each physical 3D part comprises:
extracting, from the 3D object model file, a set of 3D geometric information for the logical 3D part; and
extracting, from the set of 3D geometric information for the logical 3D part, the separate set of 3D geometric information for each physical 3D part.

3. The method of claim 2, wherein extracting the separate set of 3D geometric information for each physical 3D part further comprises:
storing the set of 3D geometric information for the logical 3D part into an separate intermediate file; and
storing an indication associating the intermediate file with the 3D object model file.

4. The method of claim 1, wherein the 3D geometric information for the physical 3D parts comprises a collection of triangle meshes and transformation matrices positioning the physical 3D parts into a build bed of the 3D printing system.

5. The method of claim 4, wherein extracting the separate set of 3D geometric information for each physical 3D part comprises:
identifying closed surfaces by locating connected regions in the collection of triangle meshes; and
for each identified closed surface, storing a corresponding triangle mesh as the separate set of 3D geometric information for a corresponding physical 3D part.

6. The method of claim 1, wherein extracting a separate set of 3D geometric information for each physical 3D part comprises:
storing an identifier associating the separate set of 3D geometric information with the logical 3D part and/or the 3D object model file.

7. The method of claim 1, wherein individually processing the separate set of 3D geometric information for each physical 3D part further comprises individually correcting errors in the 3D geometric information for the separate set of 3D geometric information for each physical 3D part.

8. The method of claim 1, wherein the separate set of 3D geometric information for each physical 3D part is individually processed in parallel.

9. The method of claim 1, wherein the physical 3D parts are printed in parallel.

10. A three-dimensional (3D) printing system comprising:
a processor; and
a memory storing instructions executable by the processor to:
receive a 3D object model file from a client device connected to the 3D printing system via a network, the 3D object model file comprising 3D geometric information for a plurality of physical 3D parts to be printed, the 3D geometric information encoded as a logical 3D part, the logical 3D part comprising merged 3D geometric information for the physical 3D parts;
extract, from the 3D object model file, a separate set of 3D geometric information for each physical 3D part;
individually process the separate set of 3D geometric information for each physical 3D part; and
print the physical 3D parts in accordance with the separate set of 3D geometric information for each physical 3D part as has been individually processed,
wherein the 3D geometric information for the physical 3D parts comprises a collection of triangle meshes and transformation matrices positioning the physical 3D parts into a build bed of the 3D printing system.

11. The 3D printing system of claim 10, wherein the instructions are executable by the processor to extract the separate set of 3D geometric information for each physical 3D part by:
extracting, from the 3D object model file, a set of 3D geometric information for the logical 3D part; and
extracting, from the set of 3D geometric information for the logical 3D part, the separate set of 3D geometric information for each physical 3D part.

12. The 3D printing system of claim 11, wherein the instructions are executable by the processor to extract the separate set of 3D geometric information for each physical 3D part by further:
storing the set of 3D geometric information for the logical 3D part into an intermediate file; and
storing an indication associating the intermediate file with the 3D object model file.

13. The 3D printing system of claim 10, wherein the instructions are executable by the processor to extract the separate set of 3D geometric information for each physical 3D part by:
identifying closed surfaces by locating connected regions in the collection of triangle meshes; and
for each identified closed surface, storing a corresponding triangle mesh as the separate set of 3D geometric information for a corresponding physical 3D part.

14. A non-transitory machine-readable storage medium storing instructions executable by a processor to:
receive a three-dimensional (3D) object model file representing a plurality of physical 3D parts to be printed, the 3D object model file comprising 3D geometric information for the physical 3D parts, the 3D geometric information s encoded as a logical 3D part, the logical 3D part comprising merged 3D geometric information for the physical 3D parts;
extract, from the 3D object model file, a separate set of 3D geometric information for each physical 3D part;
individually compute an adapted compensation factor for the separate set of 3D geometric information for each physical 3D part; and cause the physical 3D parts to be printed using a 3D printing system in accordance with the adapted compensation factor for the separate set of 3D geometric information for each physical 3D part as has been individually computed.

15. The non-transitory machine-readable storage medium of claim 14,
wherein the 3D geometric information for the physical 3D parts comprises a collection of triangle meshes and transformation matrices positioning the physical 3D parts into a build bed of the 3D printing system.

16. The 3D printing system of claim 10, wherein the instructions are executable to individually process the separate set of 3D geometric information for each physical 3D part by individually computing an adapted compensation factor for the separate set of 3D geometric information for each physical 3D part.

* * * * *